Aug. 11, 1942.   J. N. PAUL ET AL   2,292,714
CYCLIC CIRCUIT CONTROLLER
Filed Aug. 19, 1939   6 Sheets—Sheet 1

Fig.1.

JOSEPH N. PAUL   INVENTORS
HARRY A. WILCOX
BY
ATTORNEY

Aug. 11, 1942.   J. N. PAUL ET AL   2,292,714
CYCLIC CIRCUIT CONTROLLER
Filed Aug. 19, 1939   6 Sheets-Sheet 2

Fig. 2.

JOSEPH N. PAUL   INVENTORS
HARRY A. WILCOX
BY
ATTORNEY

MASTER TIMER | LOCAL CONTROLLER

JOSEPH N. PAUL
HARRY A. WILCOX   INVENTORS
BY
ATTORNEY

JOSEPH N. PAUL
HARRY A. WILCOX
INVENTORS

BY Edward H. Cairns
ATTORNEY

Patented Aug. 11, 1942

2,292,714

UNITED STATES PATENT OFFICE 2,292,714

CYCLIC CIRCUIT CONTROLLER

Joseph N. Paul and Harry A. Wilcox, Norwalk, Conn., assignors to Automatic Signal Corporation, East Norwalk, Conn., a corporation of Delaware Application August 19, 1939, Serial No. 291,015

9 Claims. (Cl. 200—27)

The present invention relates generally to electric circuit controllers and more particularly to an improved type of cyclic circuit controller adapted to a variety of uses in switching a number of circuits in a predetermined sequence of time periods. It is especially adapted for use in controlling signal circuits in street traffic signalling systems operating the usual "go" and "stop" circuits in a time cycle for example, and in the present specification is illustrated and described more particularly as applied to such a signalling system although it will be appreciated that it has many other applications as a program switching device.

A cyclic controller in accordance with the invention represents an improved and simplified controller employing a timed rotating dial bearing keys and a rotary step-by-step sequence switch actuated in steps by the various keys in sequence, the keys being adjustably fitted on the rotating dial so as to apportion the time periods during which the sequence switch remains in its several steps or switch positions. In traffic signal systems this sequence switch controls the signal circuits as actuated by the keys of the rotary timing dial.

The controller may serve in traffic signal systems for the control of signals at one isolated street intersection, or may serve as one of a series of similar controllers at a series of intersections along a highway, for example to operate the signals at the several intersections in synchronism or in some predetermined progression along the highway. The controller can also serve as a local or subordinate unit for an intersection under the supervision of a master controller to assure operation of the local signals in coordination with the master unit.

Circuit controllers with which we are familiar employing a rotating dial or other dial type time cycle divider in the prior art have been constructed with a camshaft type sequence switch, the camshaft being actuated by means of a solenoid and ratchet or by an induction type motor, the solenoid or motor being energized momentarily to operate the camshaft at desired intervals in the cycle of the rotating dial by closure of an electric operating circuit through an intermediate switch actuated by pins in the dial.

The present controller in accordance with the invention eliminates the need of such a solenoid and motor and operating circuit and intermediate switch and provides for operation of a camshaft directly from keys or pins in the rotating dial by means of simple mechanical linkage comprising a lever, pawl and ratchet arrangement. The use of entirely mechanical means in this connection in accordance with the invention avoids any contact difficulties which are likely to occur where electrical contact devices are actuated by the keys on a rotating dial, since such actuation may involve from four to twelve operations per minute in continuous traffic signalling service for example. The periods between successive step-by-step movements of the camshaft are determined by the location of the pins in the rotating dial, and can be readily changed by changing the pin locations.

It is a general object of the invention to provide a simplified and improved rotating dial type circuit controller.

Another object of the invention is to provide a circuit controller in which a step-by-step circuit switching mechanism is actuated through simple mechanical means by pins or keys placed at desired positions on a rotating dial.

Still another object is to provide improved mechanical means for cyclically resynchronizing operation of the circuit switching mechanism with the rotating dial in a controller of this type to insure correct timed relationship of the switching operations.

Another object is the provision of improved indicating changeable gear mechanism for driving the rotating dial and for facilitating the obtaining of cycles of different lengths for the rotating dial.

Still another object of the invention is the provision of improved and simplified means for superseding the automatic timing of the camshaft by the rotating dial when desired and operating the camshaft by manual control.

It is a still further object that this circuit controller shall be of rugged construction throughout and comprised of a relatively small number of simple parts whose cooperation shall be so reliable as to require a minimum of supervision, maintenance and replacements.

The nature of a preferred embodiment of the invention will be more fully understood by reference to the following description and accompanying drawings.

Figure 6:
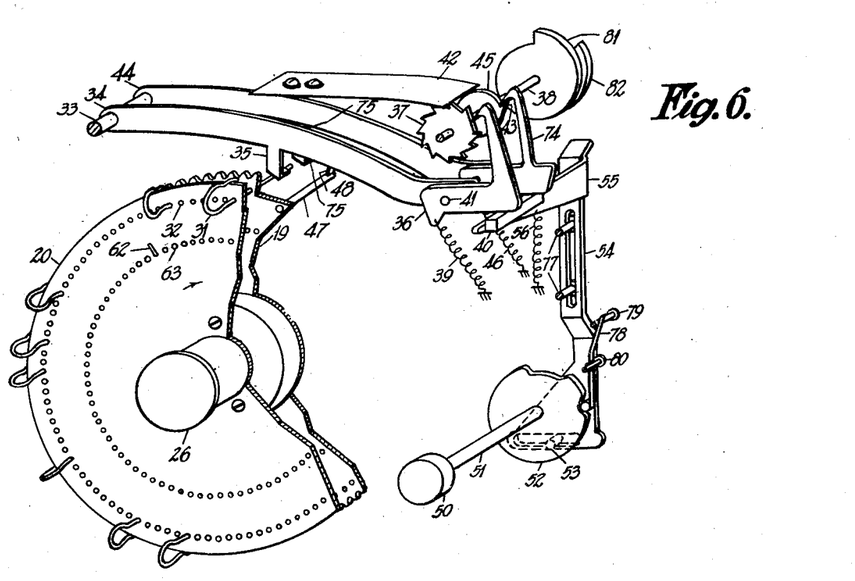
Fig. 6 is a partly schematic perspective view showing the means for advancing the camshaft by action of the pins or keys in the rotating dial, and also by manual control.

Considering now the principal operating parts of the controller and their mode of operation as illustrated in the present embodiment, before going into the details of construction, reference may best be had to Fig. 6.

Figure 1:
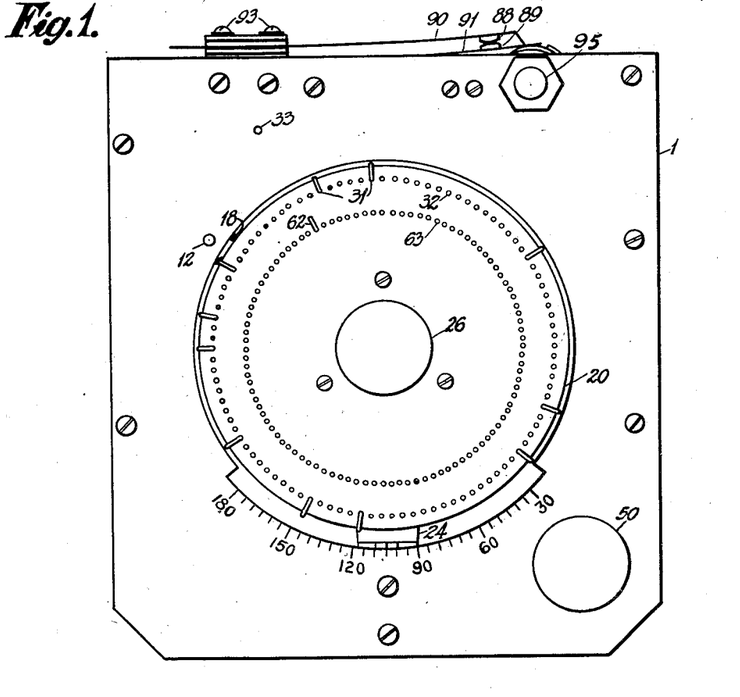
Figs. 1, 2, 3, and 4 of the drawings show respectively the front, right side, left side and top views of the circuit controller.

The rotary dial or disc 20 is shown in the left foreground in partially cut away form to provide a view of the parts behind it. The dial 20 is actually a full circle as shown in Fig. 1, and is provided with inner and outer rings of holes 63 and 32 respectively. Considering for the present only the outer holes 32 as shown in Fig. 6, a number of keys or pins 31 are fitted into selected holes 32. As shown by the arrow thereon, the dial 20 is rotated in a clockwise direction on a fixed axis by means of a synchronous motor (not shown in this figure) at a regular time rate so as to complete one revolution in a predetermined time, which may be 60 seconds for example.

The pins 31 extend out of the back of the dial 20 and at the top of their circle of revolution with the dial these pins engage the cam projection 35 on lever arm 34 which is pivoted at the left on a fixed pivot 33. As each pin momentarily engages the projection 35 it raises arm 34. At the right end of arm 34 is a pawl 36 pivoted on the arm 34 at 41. Above the pawl 36 is a ratchet wheel 37 fixed on camshaft 38 which is journaled in bearings not shown. Cams 81 and 82 on camshaft 38 illustrate two of a series of cams arranged to operate a series of switches (not shown) as the camshaft 38 rotates.

As each pin 31 engages projection 35 once in each revolution of dial 20, the arm 34 and pawl 36 are raised and the pawl engages a tooth of ratchet wheel 37, as the pin 31 passes the projection 35 the arm and pawl are allowed to drop and do so under the action of spring 39 so as to turn the ratchet wheel 37 and attached camshaft one tooth.

Thus under the successive actuation of successive pins 31 as dial 20 rotates the ratchet mechanism actuates the camshaft 38 step-by-step. The cams on camshaft 38 are arranged to provide a complete cycle of switching operations in one revolution for example and the number of pins in the dial 20 are selected to correspond to the number of teeth in ratchet wheel 37 and in turn to the number of steps in the cycle of switching operations. The spacing of the pins 31 in selected holes 32 in the dial 20 determines the proportion of the total time cycle of dial 20 devoted to the corresponding steps and switching operations of camshaft 38.

In order to insure synchronization of the cycle of camshaft 38 with that of dial 20 a dual lever, pawl and ratchet mechanism, which we believe to be novel, is provided. One pin 47 is fixed in a disc gear 19 fixed to dial 20 and is designed to extend free of and beyond the projection 35 and engages the projection 75 on arm 44 also pivoted at 33 and having at its right end a pivoted pawl 74 and a return spring 46. The latter arm and pawl cooperate once per cycle with the single tooth 43 of a second ratchet wheel 45 while the first ratchet wheel 37 presents a blank tooth to its pawl 36. If for any reason the camshaft 38 should get out of step with the dial 20 resynchronization is accomplished by stopping the camshaft at a predetermined point in its cycle and restarting it when the rotating dial reaches a corresponding resynchronizing point in the dial cycle. For this purpose the stepping of camshaft by pins 31 ceases as soon as the blank tooth of ratchet wheel 37 is presented to the pawl 36 since thereafter the raising and lowering of pawl 36 is ineffective until the dial 20 reaches its synchronizing position and pin 47 actuates arm 44 and pawl 74 to rotate ratchet wheel 45.

In the present embodiment the resynchronizing pin 47 is fixed in gear 19 but it will be appreciated that in lieu thereof a pin similar to pin 47 could be placed in a hole 32 corresponding to the resynchronizing position.

This feature of resynchronization of the camshaft with the timing dial has particular significance in connection with the manual control means which is later described herein to supersede, when desired, the automatic timing of step-by-step operation of the camshaft through its cycle. When control is returned to automatic timing by the rotating dial, the synchronizing of the camshaft therewith occurs as outlined above.

Having briefly described the principal parts and their cooperation in the timed operating cycle, reference may be had to Figures 1 to 4 inclusive showing the front, right, left and top views of the complete controller for a more detailed consideration of the construction.

In Fig. 1 a front view of the controller shows the rotary dial 20 provided with an outer ring of holes 32 and an inner ring of holes 63. The number of holes in each ring may be less or greater as desired within practical limits but may preferably be one hundred, and the dial may be marked if desired adjacent the rings of holes to indicate the percentage division of the cycle in one hundred steps of one percent each corresponding to the one hundred holes for example.

The several keys or pins 31 are removably inserted in selected holes in the outer ring 32 and are shaped with a spring bent in front of the dial and extending over the edge of the dial to clamp the pins in place by friction. The single pin 62 is removably inserted in a selected one of the inner ring of holes 63, when it is desired to synchronize the operation of the dial 20 in the controller with another controller or master cyclic timer as will be more fully described in connection with Fig. 8. The pin 62 is illustrated in a form different from pins 31 but may alternatively be shaped like pins 31 with a spring bend extending in front of the dial and turned to clamp into a nearby hole 63 for example to hold it in place more firmly if desired.

The indicator arm 24, shown below dial 20, cooperates with the gear mechanism driving dial 20 to indicate the total time of one revolution of the dial. For traffic signalling purposes this time cycle may range from 30 seconds to 180 seconds for example as shown in this figure.

The front plate 1 of the controller can be seen in Fig. 1 and on the face of this plate, in addition to the dial 20, the manual control knob 50 in the lower corner, and the bearing 95 of the signal switching camshaft in the upper right corner, and above plate 1 the switch contact springs 90 and 91 and contacts 88 and 89 can be seen. These contact springs are fixed at the left end but ride on the camshaft cams at the right end.

Referring now to the several remaining views of the controller in Figs. 2 to 5 and 7 particularly the corresponding members in the several views have the same reference character.

The front and rear frame plates 1 and 2 are held in fixed relation with each other by the spacing members 3. A sub-assembly plate 4 is located in an intermediate position by spacing member 5.

Drive for the controller is provided to the dial 20 through gearing by motor 6 which is preferably of the self-starting synchronous type. The synchronous motor shown is of the capacitor type employing a condenser 76. The motor and condenser are mounted on supporting bracket 7.

The bracket 7 is removably mounted on rear assembly plate 2 by means of the screws 8 and 8' and carries on it the motor 6 and condenser 76. Removal of the motor and bracket is facilitated by slotting the plate 7 to receive the screws on the right side of the motor shown in Fig. 2 so that these screws need only be loosened to remove the motor from the controller. The motor shaft is preferably flexibly coupled to the driving shaft 9 by a spring coupling 10 or other flexible coupling means. Shaft 9 extends through a suitable bearing in plate 4 and carries on its forward end the driving pinion 11. (See Fig. 5.)

Figure 2:
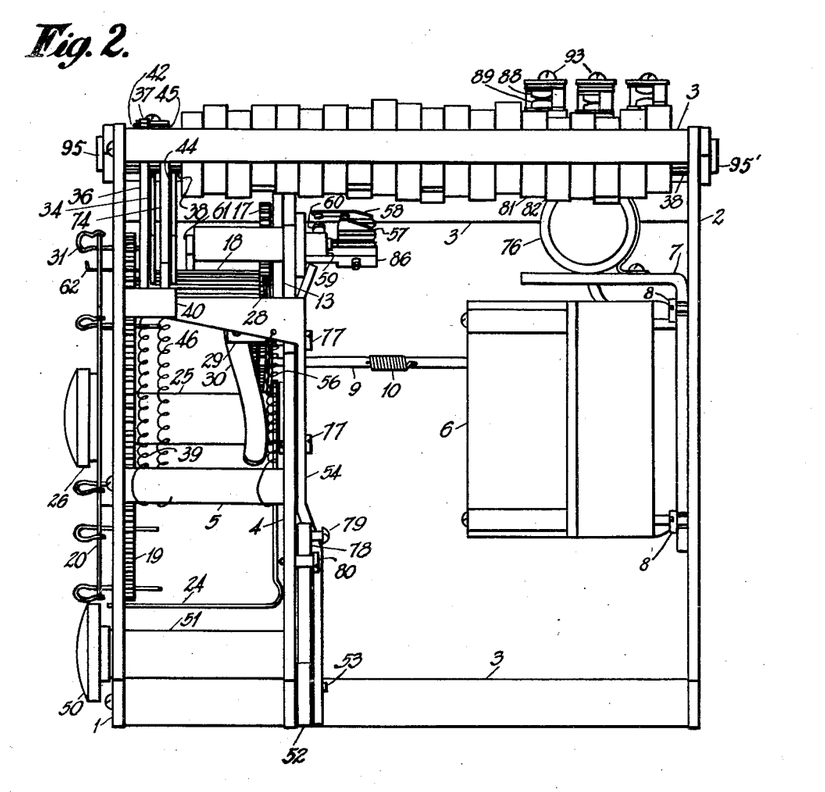
Figure 3:
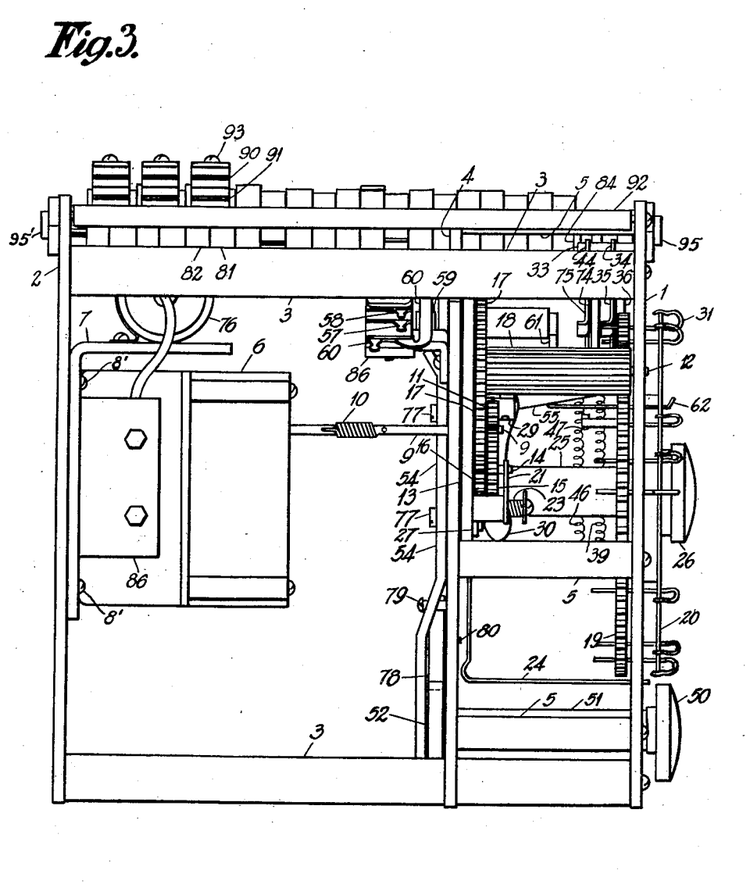
Figure 4:
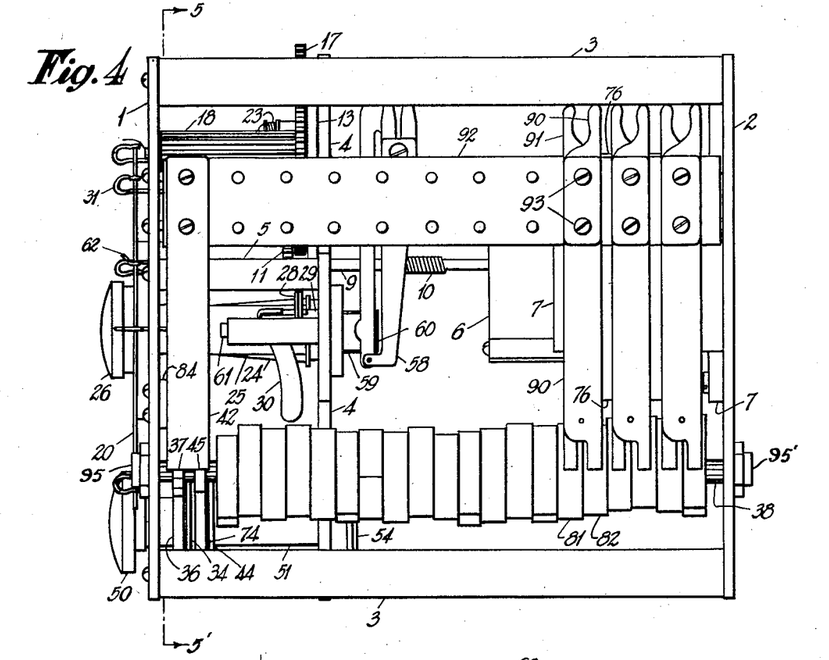
Figure 5:
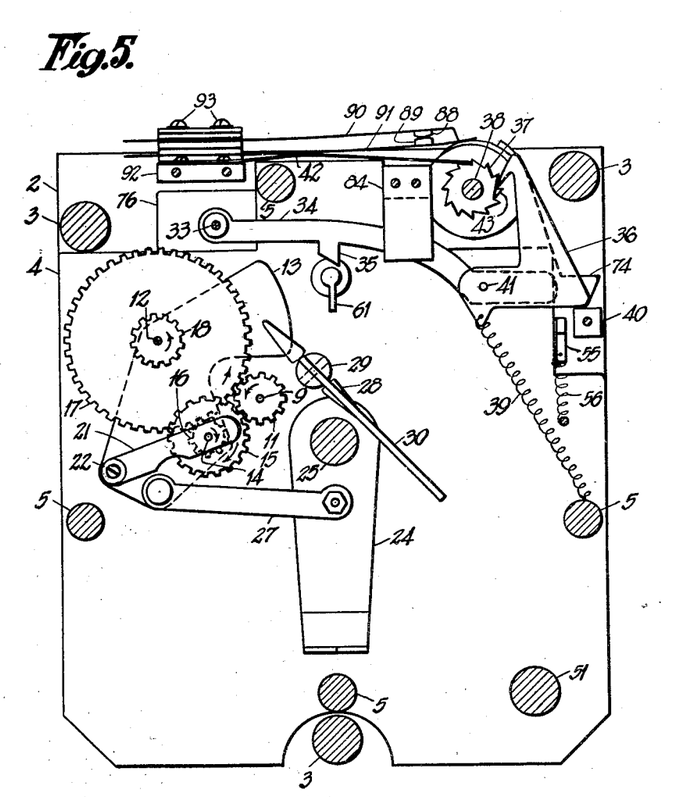
Fig. 5 is a view along the line 5—5' of Fig. 4 looking toward the rear of the controller.
Figure 7:
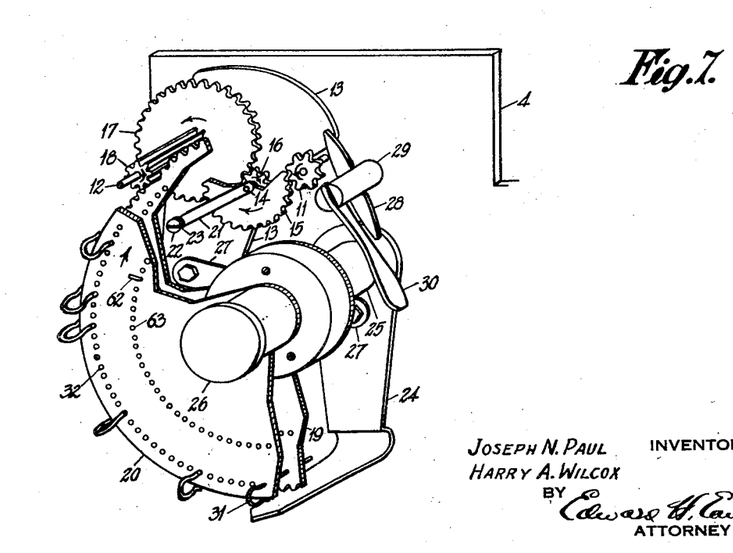
Fig. 7 is a partly schematic perspective view showing the driving means for the rotating dial including the gear system, cycle length indicator and clamping arrangement for securing members of the gear system.

In Fig. 7 the front assembly plate 1 and portions of other parts have been cut away to illustrate better the working parts which also appear in other views in Figs. 2 to 4. The dial 20 is adapted by suitable bearings to revolve on shaft 25 which is mounted on and extends forwardly from sub-assembly plate 4. The dial 20 carries on its rear side and fixed to it the gear 19 and both are removably held in position to rotate on shaft 25 by screw 26. The dial 20 and gear 19 are driven from pinion 11 by intermediate gears, 15, 16, 17, 18.

As in many other cycle circuit controllers the length of the total time cycle is altered by substituting gears of different sizes in a gear train which drives the rotating disc and the present invention provides a simple and improved speed change gear system for this purpose. A clamping device forms part of the arrangement for securing firmly in place the parts of the gearing system with any of the several speed gears supplied, and an indicator denotes the length of the cycle resulting from the particular gear arrangement in use at any time.

Pivotally mounted on shaft 12 is an irregular shaped support plate 13 on which the stud 14 is mounted to carry step gear 15—16 comprising the two gear wheels 15 and 16 fixed together on a common axis. Pinion 11 engages teeth in gear 15 and gear 16 in turn meshes with the step gear 17—18 which is fitted to shaft 12. Gear 18 drives gear 19 and dial 20.

To obtain various speeds of dial 20 a number of step gears 15—16 are supplied in which the gear 15 portion has different numbers of teeth. The indicator arm 24 is pivotally mounted at the rear end of shaft 25 and is connected to the gear plate 13 by link member 27. To accommodate the different sizes of step gears 15—16 the gear plate assembly and indicator arm may be swung out of position to the left while the gear change is made and then with the proper speed gear in place the indicator arm 24 may be moved as far as possible to the right until the gears 15 and 11 mesh. The pointer forming the forward part of arm 24 indicates on the scale on the front assembly plate 1 the cycle length in seconds, the number of seconds for one revolution of disc 20 for example, obtained with any particular gear in place. A clamp 28 is mounted in the slotted post 29 and is forced into position by the cam-shaped clamp arm 30 to secure the gear plate assembly and indicator arm firmly against the plate 4 for preventing relative movement between the parts during operation of the controller.

As the step gear 15—16 is free to rotate on stud or shaft 14 a holding member 21 pivotally mounted by screw 22 is provided to keep step gear 15—16 in place on its shaft. Slight pressure on member 21 by the spring 23 causes the member 21 to bear on the end of shaft 14. This member may readily be lifted off the end of the shaft and swung aside during a change of gears.

Referring now particularly to Fig. 6 in connection with Figs. 1 to 4, the mechanism for operating the camshaft 38 step-by-step through its cycle will be described in more detail. It will be appreciated that although the camshaft shown in the present embodiment has twelve positions or steps in a cycle it may equally well be constructed with more or less positions with a corresponding change in the number of pins 31 in dial 20. In this connection it will be noted that the eleven pins 31 in dial 20 and the pin 47 together provide the twelve actuations for the twelve steps of the camshaft cycle.

The camshaft 38 is mounted in suitable bearings 95—95' in plates 1 and 2 and carries the ratchet wheels 37 and 45 at its forward end, and a plurality of cams along its length.

Eleven keys or pins 31 are inserted in the outer row of perforations 32 on the dial 20. These keys project through the disc and through matching holes in the gear 19 which forms an integral part with the disc 20. Pivotally mounted on pin 33, which is fixed into the rear of the front assembly plate 1, is lever arm 34 having a projection 35 shaped to move the lever arm upward when the dial 20 rotates any one of the pins 31 to the top of its circle of revolution. Carried at the free end of lever 34 is a pawl 36 which cooperates with ratchet 37 on camshaft 38. When the lever 34 and pawl 36 are raised by action of the pin 31 the pawl engages a tooth on the ratchet wheel and the spring 39 returns the pawl 36 and lever 34 to its original position where the pawl 36 rests against backstop 40. This action turns the camshaft clockwise one twelfth of a revolution. The spring 39 is so attached to pawl 36 in respect to the pin 41 by which the pawl 36 is mounted on arm 34 that the face of the toothed end of pawl 36 is forced forward into positive engagement with the tooth of ratchet wheel 37. Location of the backstop 40 is such that when pawl 36 so seats against it the spring 39 maintains the pawl in positive engagement with ratchet 37 to prevent over travel of camshaft 38. Dead pawl 42 prevents backward or counterclockwise movement of the camshaft 38.

For the purpose of synchronizing each cycle of the camshaft 38 and disc 20 there is a blank space in place of one tooth in ratchet 37 thus providing a "rest" position of the camshaft from which pawl 36 cannot advance the ratchet 37. The second ratchet wheel 45 is positioned alongside of ratchet 37 on the camshaft, the ratchet 45 having only a single tooth 43, located in the position corresponding to the vacant space on ratchet 37. Lever arm 44, pawl 74 and spring 46, similar to lever 34, pawl 36 and spring 39, cooperate with ratchet 45. The pin or crank arm 47 is fitted to the rear of gear 19 to clear lever 34 and by means of an extension 48 at its end engages the projection 75 on lever 44 to cause operation of camshaft 38 from the rest position at the point in the cycle or dial 20 where arm 47 is effective. Mounted on the rear of front assembly plate 1 is a spacing member 94 containing parallel slots for accommodating the two lever arms 34 and 44 and keeping these arms in proper spaced relation with each other and with their associated ratchets.

As may best be seen from Figs. 2 and 4 in the present embodiment two spiral cams 81 and 82 are employed to operate each set of cam operated contacts 88, 89 carried by the pair of contact springs 90, 91. The pair of contact springs 90, 91 are insulatedly mounted on a support bar 92 by screws 93, each contact spring being adapted at its mounted end for the fastening of wires forming part of the circuit to be controlled. With this arrangement the contact spring pressure or loading on the camshaft is made uniform, the cam contacts being made when the upper spring of the pair drops from the high to the low point on its cam and being broken when the lower spring of the pair drops from the high to the low point on its cam. Each cam is capable of relative rotary movement on the camshaft by loosening its set screw so that any desired division of the cycle between open and closed circuit conditions may be obtained. When the circuit controller is used in a traffic signal system a number of the cam contacts are used for switching on and off the red, amber and green signals to the intersecting streets or traffic lanes in accordance with conventional practice.

In the present embodiment ten pairs of cam operated springs and contacts are provided (of which three pairs only are shown in the drawings) for controlling ten circuits. If it is desired to control more than ten separate circuits more sets of cams and contacts may be provided by increasing the front to rear dimension of the controller or adding an auxiliary camshaft geared to the main shaft.

To provide for manual operation of the signals, stepping of the camshaft may be rendered independent of the automatic timing of dial 20 by turning the manual control handle 50 (Figs. 2 and 6) clockwise approximately ⅓ revolution to a point which may be marked "manual" on the front panel 1. This causes the shaft 51 to rotate the irregular shaped cam 52 mounted at the rear end of shaft 51.

Pin 53 on the cam, moves in the horizontal slot in lever arm 54 and serves as a crank arm to raise lever 54. The bent over end 55 of the lever arm 54 in turn bears against the bottoms of the pawls 36 and 74 raising them and their associated lever arms out of range of the actuating pins 31 and crank arm 47. Accordingly the camshaft 38 remains in the position into which it had last been moved by action of the pawls and ratchets. Advancement of the camshaft to its next position is accomplished manually by turning the handle 50 an additional partial clockwise revolution and then allowing it to snap back to the normal position again. This action causes the lever 54 to rise slightly higher, extending spring 56 forcing both pawls 36 and 74 into engagement with the next teeth in their respective ratchets and then by the tension in the extended springs 46, 39 and 56 to return the pawls and bent over end 55 of lever arm 54 to the normal manual position just described, thereby advancing the camshaft 38 one position.

A flat spring 78 supported by the pins 79 and 80 bears against the edge of cam 52 which is so shaped to cause the manual control handle 50 to rest normally in either the automatic or manual positions.

Where traffic signal controllers are employed at a number of intersections at which the signals are synchronized or coordinated in some cyclic pattern it is essential that the controllers maintain a predetermined cyclic time relation with one another. The rotating dial of the present controller is therefore preferably driven by a self-starting synchronous motor to keep the dial in synchronism with the corresponding dials in other such controllers in event the controllers are employed on a common alternating current power line in a coordinated system.

The controller embodies additional provision for keeping a plurality of controllers in synchronism however by means of forcing the rotating dial in each machine to start each cycle only during the predetermined impulse period of a cycle master timer connected to all the controllers. The point in the cycle of each machine at which synchronization occurs may be varied in the several controllers by changing the position of pin 62 in the inner circle of perforations of the dial to establish a desired time spacing between corresponding camshaft switching operations in different controllers for establishment of a progressive traffic signalling system.

Figure 8:
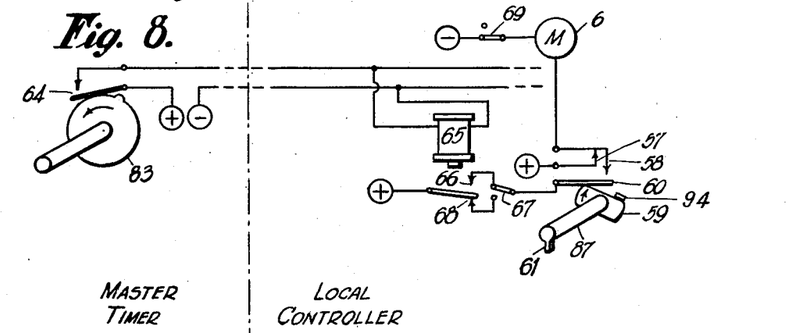
Fig. 8 is a schematic circuit diagram of an arrangement for maintaining the driving motors in a plurality of controllers in a definite time relationship with a cyclic master timer.

Figure 8 comprises a schematic circuit diagram of the arrangement for insuring that the motor of a local signal circuit controller of this type be maintained in step with the motors of other controllers in a coordinated system. Ordinarily it is not necessary to provide any such arrangement where synchronous motors of a system are supplied with alternating current power from a common source as such power will keep these synchronous type motors in synchronism but where it is desired to provide a periodic check on the motor operation any one of a number of arrangements of which the one shown in Figure 8 is an example may be used.

The circuit arrangement of Figure 8 provides a master control means comprising a cyclic timer having a time cycle of the same length as that of the local circuit controllers to be governed which timer transmits an impulse to the local controllers during a short period once in each cycle. Each local controller normally receives power directly from the power line except at one point in its own cycle when the power is interrupted and it is dependent upon the impulse from the master timer to continue operation. Ordinarily the local synchronous motor will reach the preset power interruption point during the impulse period of the master and will continue operation without stopping but if the local motor gets out of step with the master it will stop at the preset point until the impulse from the master is received, whereupon it will recommence operation in step with the master timer.

Power to the motor 6 of the controller is normally supplied from the line through break contacts 57, 58 of a make-break contact pileup operated by a cam 59. This cam and contacts are shown in Figures 3 and 4. Cam 59 is mounted at the rear end of a shaft 87 mounted in a suitable bearing in plate 4. At its forward end the shaft 87 is fitted with an arm 61 which is adapted to be engaged by a pin 62 inserted in any one of the inner row of perforations 63 in disc 20.

For convenience of illustration in this schematic diagram of Figure 8 the rotation of the shaft 87 and cam 59 are reversed from that shown in the other figures of the preferred embodiment.

The shaft 87 and cam 59 as shown in Figure 8 are thus actuated in the direction of the arrow marked on cam 59 once in each cycle of the disc 20 at a preset point in the cycle determined by the location of pin 62. When dial 20 has revolved a short distance farther in the cycle so that pin 62 clears the arm 61 the spring contacts 57, 58 cause the cam 59 and arm 61 to assume again their original position against stop 94 with contacts 57, 58 closed and contacts 58, 60 open in readiness for actuation again by pin 62 in the next cycle of dial 20. When, however, the pin 62 bears against arm 61 to move cam 59 the make-break contact pileup closes the circuit through make contacts 58, 60 then opens break contacts 57, 58. Referring again to Figure 8, power to the motor is interrupted by the opening of break contacts 57, 58 and the motor is stopped until power is supplied by a circuit through contacts 58, 60 which is operated by the master control timer.

The master timer for all the controllers of the group consists essentially of a synchronous motor driven circuit closer 83 which preferably has the same cycle length as the dial 20 in the local controller. The circuit closer 83 closes contact 64 for a short period in its cycle to complete a circuit to energize relay 65 in the local controller. A power circuit to the motor 6 is thus established via relay contact 66, switch 67 and contacts 58, 60 and dial 20 thereupon revolves permitting reclosure of contacts 57 to restore the normal power circuit to the motor before opening of contacts 58, 60.

In some instances the master control timer is arranged normally to transmit an impulse energizing the several relays 65 and to interrupt the circuit to the relays once each cycle, for resynchronization. When the latter type of master timer is provided switch 67 is turned to its lower position so that the power to the motor 6 in the local controller will then be furnished in the synchronizing point via contacts 68, switch 67 and contacts 58.

The local controller is provided with a switch 69 which may be opened manually to stop the motor 6 if a traffic officer or other authorized person is desirous of synchronizing the controller with other controllers manually.

In summary it will be seen from the foregoing that applicants' invention is for a rotating dial type circuit controller for use in a plurality of circumstances and particularly as a universal traffic signal controller. The controller disclosed provides novel gear-changing speed change mechanism for the drive for the rotating disc. Also embodied are novel mechanical means in the form of dual lever, pawl and ratchet combinations for maintaining the cyclic step-by-step camshaft switching mechanism in synchronism with the rotating dial. Moreover synchronization of the rotating dials in a plurality of controllers is provided by synchronous motor operation or by master timing means which govern the starting of each cycle of operation of the discs, or by both. A manual control is provided so that when set in the manual position the automatic timing by the controller is rendered ineffective, operation of the synchronous motor and dial is not interfered with and upon successive operations of the manual control handle the controller is actuated step by step in its cycle of switching. When the manual control is again returned to the automatic position the camshaft is synchronized with the rotating dial by action of the synchronizing dual pawl and ratchet arrangement before one full cycle of the dial elapses. Timing of the several switching operations thereafter is determined by the preset spacing of the pins on the dial.

Although dial 20 and gear 19 are shown as separate discs fixed together, it will be understood that these members might be combined into a single dial and gear disc. It will also be appreciated that although the dial-camshaft resynchronizing pin 47 is illustrated as preferably of a shape to clear projection 35 on arm 34, this pin might be of the same shape as the pins 31 but longer than the latter and inserted in one of the outer holes 32 in the dial. In the latter arrangement the pin 47 would actuate both arms 34 and 44 but this would not interfere with its resynchronizing function since the camshaft would still rest in the resynchronizing position until the longer pin 47 actuated arm 44 (in addition to arm 34).

When used as a traffic signal controller, one cycle of the camshaft 38 normally would provide a complete traffic signal cycle including four steps comprising a green signal period for one street, a shorter amber signal period for that street, a green signal period for the intersecting street and a shorter amber signal period for the latter street for example, and for such a cycle one pin 47 and three pins 31 would be used in dial 20. The spacing between the several pins would determine the proportion of the total dial cycle time that would be given to the corresponding signal periods. However there are many types of signal cycles in traffic signal systems, including more than four steps or signal periods. For example some signal systems employ two successive amber signal periods for each street with a signal color overlap in one or both periods, other systems employ two successive periods for the green signal to provide for the display of auxiliary walk signals during a part of the full green signal period or for other purposes. In addition the controller is sometimes employed to control more than two streets at one complex intersection and to provide separate pedestrian signal periods in the cycle, which may involve a total of nine or twelve signal periods for example. In some instances a single controller is used to control signals at two or more street intersections in predetermined time relation and for this purpose the number of steps in the camshaft cycle and pins in the dial cycle may be doubled as compared with those required for a single intersection.

All of these variable signaling conditions show the need for an extremely flexible type of signal circuit controller such as herein disclosed, as the length of the total signal time cycle and the subdivision of the cycle into a considerable number of parts of various time length must both be readily accomplished. In addition the use of the controller to operate street traffic signals involves the safety of the public using the streets and the controller must be reliable in operation.

The advantage of the simplicity of a mechanical linkage from the pins of the rotary timing dial to the ratchet of the signal camshaft in accordance with our invention can be appreciated in that the operation involves relatively slow smooth loading of a spring followed by quick positive release of the spring to operate the ratchet and camshaft one step on the return stroke of the spring. Any slight irregularities in the pressure of the actuating pin against the projection 35 on arm 34 for example will not affect this operation, but if a pair of electrical contacts were actuated by the pin to actuate a solenoid to operate the ratchet 37 in lieu of the present construction, any such slight irregularities in pressure of the pin against the electrical contact device might easily cause multiple closures of the contacts and corresponding multiple operations of the solenoid so that the camshaft might improperly be notched two or more steps by a single pin.

A further advantage of applicants' mechanical linkage over the electrical form of linkage appears in event of a power failure during the time of pin actuation. In the electrical linkage the electrical contact is closed at this time and the solenoid, having been energized, would return to normal and thus notch the camshaft one step when power failed; then when power was restored again the electrical contact would still be closed and the solenoid would again be energized thus causing two steps of the camshaft from one pin actuation. In applicants' mechanical linkage however it will be noted that the loading of the ratchet rotary spring is interrupted only during the power failure and the action is resumed when power returns. Either the pin has proceeded far enough in its stroke on projection 35 to cause the camshaft to be notched at or before the moment of power failure or it will have to complete such stroke after power is restored, but in either case only one actuation is possible by any one pin.

It will be obvious to those skilled in the art that numerous other changes in the form, arrangement and character of the various parts of our illustrated embodiment may be made without departing from the spirit of the invention as defined by the claims.

Having described the invention, what we claim as new and desire to secure by Letters Patent of the United States is as follows:

1. In a cyclic circuit controller the combination of a step-by-step cyclic switch, a dial, adjustably spaced keys mounted on said dial, ratchet mechanism actuatable to step said cyclic switch, motor mechanism providing relative rotary movement between said ratchet mechanism and said dial, said ratchet mechanism and keys being placed for mechanical actuation of said ratchet mechanism by said keys during such rotary movement, said ratchet mechanism comprising a ratchet wheel fixed to said cyclic switch and a pawl and lever member in position to be actuated by said keys for engaging said ratchet wheel directly, and another pawl member engaging said ratchet wheel to prevent backward movement thereof, said ratchet wheel having teeth extending around its periphery except for a blank space in place of one tooth, a second ratchet wheel also fixed to said cyclic switch with a single tooth corresponding in angular position with the blank space on the first mentioned ratchet wheel, a second pawl and lever member for actuation of the second ratchet wheel only, and an additional key placed in said dial in position to actuate only said second pawl and lever member.

2. A cyclic circuit controller comprising a step-by-step cyclic switch, a rotary dial, a plurality of keys adjustably fixed in said dial in various angular positions about its axis of rotation, a ratchet wheel fixed to said cyclic switch, a pivoted arm having a normal position from which it is adapted to be moved about its pivot by said keys as said dial is rotated, a pawl pivoted on said arm in position to engage said ratchet wheel as said arm is so moved by said keys, a spring attached to said arm to return the latter to its normal position and so rotate said ratchet wheel and cyclic switch one step by each actuation of said arm by one of said keys, stop means limiting such return movement of said arm, a second ratchet wheel fixed to said cyclic switch, a second similar pivoted arm placed out of range of said keys, an additional key fixed in said dial and extending beyond said first mentioned keys so as to engage with the second mentioned arm at a certain point in the rotation of said dial, a second pawl for engaging said second ratchet wheel, said first ratchet wheel having teeth at a plurality of positions around its periphery except for one blank space in which a tooth is omitted, said second ratchet wheel having one tooth in angular positon corresponding with said blank space on said first ratchet wheel.

3. In a cyclic circuit controller the combination of a step-by-step cyclic switch, a dial, adjustably spaced keys mounted on said dial, ratchet mechanism actuatable to step said cyclic switch, motor mechanism providing relative rotary movement between said ratchet mechanism and said dial, said ratchet mechanism and keys being placed for mechanical actuation of said ratchet mechanism by said keys during such rotary movement, said ratchet mechanism comprising a ratchet wheel fixed to said cyclic switch and a pawl member in position to be actuated by said keys for engaging said ratchet, and another pawl member engaging said ratchet wheel to prevent backward movement thereof, said ratchet wheel having teeth extending around its periphery except for a blank space in place of one tooth, a second ratchet wheel also fixed to said cyclic switch with a single tooth corresponding in angular position with the blank space on the first mentioned ratchet wheel, a second pawl for actuation of the second ratchet wheel only, and an additional key fixed in said dial in position to actuate only said second pawl, and a manually operable member for moving said pawls out of range of actuation by said keys and into position for direct manual actuation of said ratchet wheels.

4. In a cyclic circuit controller the combination of a step-by-step cyclic switch, a dial, adjustably spaced keys mounted on said dial, ratchet mechanism actuatable to step said cyclic switch, motor mechanism providing relative rotary movement between said ratchet mechanism and said dial, said ratchet mechanism and keys being placed for mechanical actuation of said ratchet mechanism by said keys during such rotary movement, said ratchet mechanism comprising a ratchet wheel fixed to said cyclic switch and a pawl member in position to be actuated by said keys for engaging said ratchet, and another pawl member engaging said ratchet wheel to prevent backward movement thereof, said ratchet wheel having teeth extending around its periphery except for a blank space in place of one tooth, a second ratchet wheel also fixed to said cyclic switch with a single tooth corresponding in angular position with the blank space on the first mentioned ratchet wheel, a second pawl for actuation of the second ratchet wheel only, and an additional key fixed in said dial in position to actuate only said second pawl, and a manually operable member for moving said pawls out of range of actuation by said keys and into position for manual actuation of said ratchet wheels, said manually operable member including an arm engaging both said pawls to actuate both of said pawls into operating position to actuate said ratchet wheels at each manual operation of said member.

5. In a cyclic controller as in claim 4, said manually operable member including a cam, a rider arm bearing on said cam and having an extension adjacent to said actuating pawls, said cam having a normal position to hold said rider arm free of said pawls, and manually operable means for rotating said cam to move said rider arm to a second position to move said pawls out of range of actuation by said keys, said cam being adapted to move said rider arm to a further position to actuate said pawls to engage said ratchet wheels, and spring detent means to hold yieldably said cam in said normal position and said second position alternatively, and spring means for restoring said cam and rider arm and pawls from said further position to said second position after each manual operation of the same to said further position and thereby to rotate said cyclic switch one step for each manual operation.

6. In a traffic signal controller, a plurality of signal switches, a cam shaft having a cycle of more than two different positions through which it is adapted to be rotated to operate said signal switches to provide a signalling cycle, a rotary disc having a plurality of perforations therein in various angular positions circularly arranged and closely spaced and of much greater number than the number of said camshaft positions, a time controlled motor driving said disc to time the total signal cycle, ratchet mechanism connected with said camshaft and actuable to rotate said camshaft, a plurality of pins fitted in selected perforations in said disc, and a direct mechanical linkage with said ratchet mechanism and in position to be actuated by said pins to actuate said ratchet mechanism to determine the time periods of the several signalling positions of said camshaft in said total cycle, said mechanical linkage including a lever arm pivoted on an axis parallel to the axis of the rotary disc, stop means arranged to provide a normal resting position for said lever arm, a beveled cam surface on said lever arm for engaging said pins to rotate said lever arm through a small angle about its axis, and then release the same to return to said normal position, said ratchet mechanism including a ratchet wheel mounted on said camshaft, a pawl pivoted on the free end of said lever arm, and in position to engage said ratchet wheel to rotate the latter one position over a considerable angle by rotation of said lever arm from and to said normal position by each of said pins, said pawl and lever member being arranged to rotate said ratchet over such considerable angle by pin actuation and release as said dial is rotated through a small angle less than the spacing between perforations.

7. In a traffic signal controller, a plurality of signal switches, a camshaft having a cycle of more than two positions through which it is adapted to be rotated to operate said signal switches to provide a signalling cycle, a rotary disc having a plurality of perforations therein in various angular positions circularly spaced, a time controlled motor driving said disc to time the total signal cycle, a plurality of pins fitted in selected perforations in said disc at close spacing and of number much greater than the number of camshaft positions, a ratchet wheel fixed to said cam shaft, a lever arm pivoted on an axis parallel to the axis of the rotary disc, stop means providing a normal resting position for said lever arm, a beveled cam surface on said lever arm for engaging said pin to rotate said lever arm about its axis through a small angle and then release said arm, means returning said arm to normal position upon such release, and a pawl pivoted on the free end of said lever arm in position to engage said ratchet wheel to rotate the latter one position by rotation of said lever arm from and to said normal position by each of said pins, said pawl and lever being arranged to rotate said ratchet wheel over a considerable angle as said disc is rotated through a small angle less than the spacing between perforations.

8. In a traffic signal controller, a plurality of signal switches, a camshaft having more than two different cam positions to which it is adapted to be rotated to operate said signal switches to provide a signal cycle, a rotary disc having a plurality of holes therein arranged at equal very close spacing in a circle on the face of the disc and the number of holes being much greater than the number of positions of said camshaft, a time controlled motor rotating said disc, a plurality of pins fitted in selected holes of said disc and extending substantially parallel to the axis of said disc, a lever arm pivoted on an axis parallel to the axis of said disc and having a beveled cam surface to engage said pins to rotate said lever arm through a small angle and then to release the same to return through said angle by action of each pin as said disc rotates through a small angle less than the spacing between adjacent holes, a ratchet wheel fixed to said camshaft, and a pawl pivoted on a free end of said lever arm in position to engage said ratchet wheel and rotate the same one position over a considerable angle by rotation of said lever arm by action of each of said pins.

9. In a traffic signal controller, a plurality of signal switches, a camshaft having a plurality of positions through which it is adapted to be rotated to operate said signal switches to provide a signalling cycle, a rotary disc having a plurality of pins placed in selected angular positions therein at very close angular spacing and extending parallel to the axis of rotation of the disc, the number of pins being equal to the number of positions of said camshaft, a time controlled motor rotating said disc, lever arm means pivoted on an axis parallel to the axis of said disc and having a beveled projection to engage said pin to rotate said lever arm means through a small angle and then release the same by action of said pins, ratchet wheel means fixed to said shaft, pawl means pivoted on a free end of said lever arm means in position to engage said ratchet wheel means by rotation of said lever arm means by said pin, and spring means to return said lever arm means to rotate said ratchet wheel means one position for each pin actuation, said beveled projection being arranged nearer the pivot of the lever arm than said free end on which said pawl is pivoted.

JOSEPH N. PAUL.
HARRY A. WILCOX.